Patented July 21, 1936

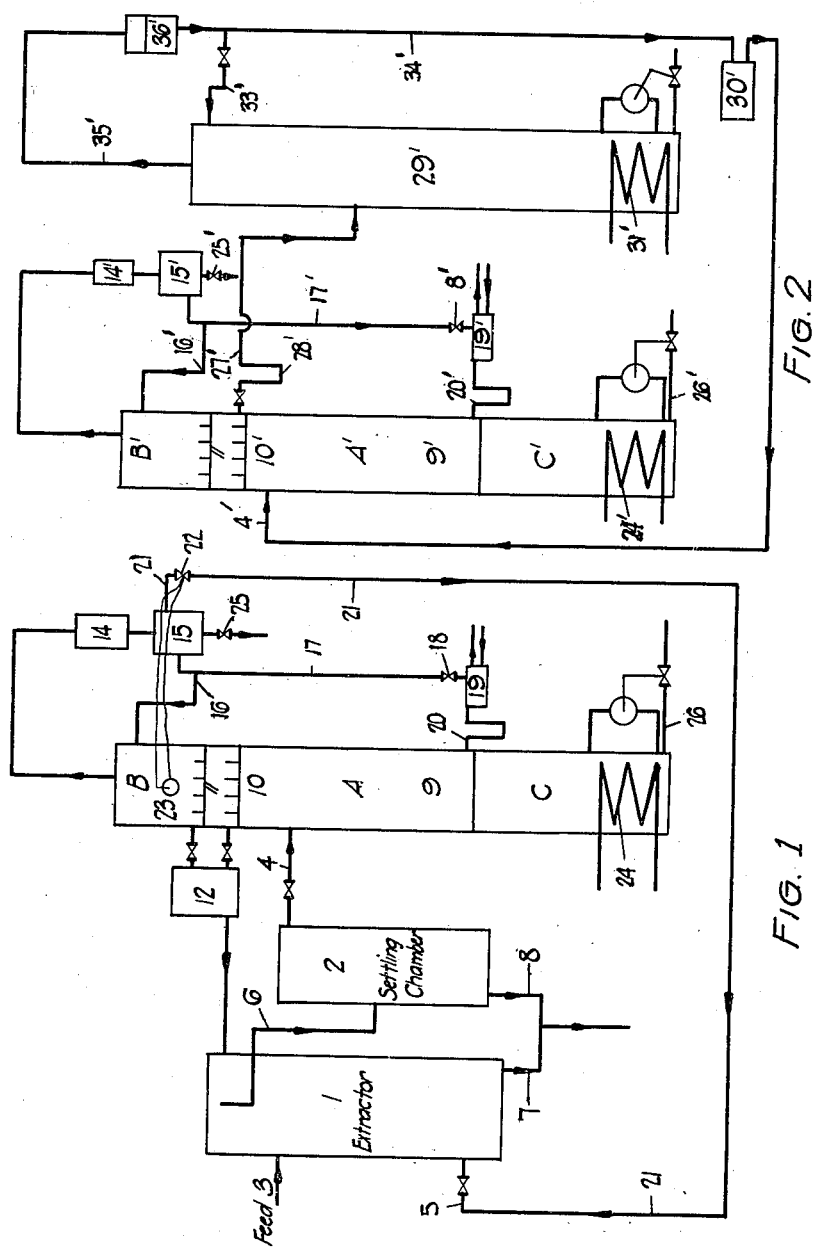

2,048,178

UNITED STATES PATENT OFFICE 2,048,178

PROCESS FOR DEHYDRATING ORGANIC COMPOUNDS

Samuel C. Carney, Berkeley, Calif., assignor to Shell Development Company, San Francisco, Calif., a corporation of Delaware Application November 21, 1930, Serial No. 497,249
Renewed January 11, 1935

36 Claims. (Cl. 202—41)

This invention relates to an improved process of and means for carrying out the dehydration of organic compounds.

My invention is more specifically concerned with the dehydration of organic compounds wherein the separation of the aqueous constituent from the organic constituent is effected by the employment of the combined partial pressures of the aqueous constituent and of a third agent without the formation of azeotropic mixtures whenever possible.

It has been customary in the art to produce anhydrous organic compounds such as alcohols, esters, aldehydes, ketones and the like by the deliberate formation of azeotropic mixtures which are distilled off from the compound desired to be dehydrated. According to my views, this procedure is very unsatisfactory for many reasons. The azeotropic mixture, whether binary or ternary, carries off with it, upon distillation, a substantially large amount of the compound to be dehydrated. In order that the loss be kept as low as possible resort is had to a multiple arrangement of apparatus whereby separation of the desired compound is effected and a purified reflux obtained. Not only are a large number of structural units, as recovery columns, separating chambers, scrubbing chambers, condensers, dephlegmators and the like required, which occupy a great deal of space and involve a large expenditure of money, but a number of heating units are necessitated in order to effect the various separations and these heating units depreciate the practicable economy of the process as they affect the value of the final product in proportion to the number of units employed.

I have found that organic compounds can be cheaply and simply separated from their aqueous content if the vapor pressure of a liquid immiscible with water be employed in conjunction with the vapor pressure of the aqueous constituent. Not only is the process thus simplified but substantially no azeotropic mixtures are produced which would necessitate further treatment for the recovery of the organic compound. In certain cases, some azeotropes are bound to occur but the proportion formed is so small that it may well be disregarded as affecting my basic process. In those special instances where an azeotrope may occur in small quantities, even though not desired, a simple recovery treatment may follow the fundamental dehydrating treatment.

While my invention may be carried out in connection with many different types of liquid mixtures or solutions, such as alcohols, esters, aldehydes, ketones and the like, I shall, for example, describe it in connection with the production of absolute alcohol. The term "alcohol" is to be understood to include primary, secondary and tertiary alcohols and polyhydric as well as monohydric alcohols.

The employment of a hydrocarbon in vapor form permits the selection of relatively light hydrocarbons, whose boiling points are substantially below the boiling point of the aqueous organic mixture. Olefine and paraffin hydrocarbons may be utilized in my process as third agents, as they are substantially insoluble in water and soluble in anhydrous alcohols in all proportions. Pentane, isopentane and butane are especially desirable in my process. Commercial pentane of about 10° F. boiling range has been found to be most desirable. It is here noted that in general my process can be carried out with compounds which are substantially immiscible with water but substantially miscible with the organic compound to be dehydrated and which do not substantially form azeotropic mixtures with either the water or the organic compound.

While my invention is capable of embodiment in many different forms, for the purpose of illustration I shall describe only certain forms thereof hereinafter, and while it is capable of being carried out in many different kinds of apparatus, I have shown only two forms of the same in the accompanying drawing, wherein like reference characters designate corresponding parts throughout the several figures, in which—

Fig. I is illustrative of a schematic form of apparatus and a flow sheet utilized in connection with my invention.

Fig. II is illustrative of a modification of Fig. I.

With reference to Fig. I: 1 is a countercurrent liquid extractor, preferably equipped with mechanical agitation and 2 is a settling tank. Feed consisting of alcohol with such a percentage water as is the practical result of the process of its production and preliminary distillation enters as a liquid at 3. If an alcohol is used from which water is not practically removed by extraction with a hydrocarbon, it may enter 4 as a vapor or as a liquid after "salting out" in the customary manner.

As an example, secondary butyl alcohol entering at 3 is extracted with pentane entering at 5. The mixture of alcohol, pentane and water flows through pipe 6 to settling chamber 2. The water which separates out in 1 and 2 is removed at 7 and 8. It contains some alcohol, to recover which it may be distilled in an alcohol recovering column, or used for acid dilution, etc. The extracted feed enters dehydration column 9 at 4. The column is of the conventional plate type except that plates 10 and 11 are built with vapor nozzles longer than usual so that the bubbling caps are raised above the plate to facilitate the drawing off into decanter 12 of a "water" layer which will collect on these plates. For purposes of description only, the column is divided into three sections, A, B and C. A is the dehydrating section, B the rectifying section and C the exhausting section. The reflux in liquid state, being condensed by condenser 14, after separation of water in decanter 15, flows through pipe 16 to the top plate in column 9. The reflux, such as pentane, at the top of the dehydrating column is the pure hydrocarbon while the vapor to the reflux condenser 14 is that of hydrocarbon and water, with small amounts of alcohol in certain instances.

A portion of pentane from decanter 15, determined by manually operated valve 18 flows as a liquid through pipe 17 into steam heated vaporizer 19. There it is vaporized and the vapor introduced at the bottom of section A of the dehydrating column. Thus the hydrocarbon introduced as a vapor at a point below the feed plate and above the exhausting section carries the water up the column due to the combined vapor pressure of the hydrocarbon and the water at the existing temperature.

The remainder of the pentane condensed by condenser 14 flows through pipe 21, controlled by valve 22 which is automatically operated by thermostat 23, back to extractor 1 at 5.

The amount of hydrocarbon flowing back through pipe 21 equals the amount entering the feed at 4 in solution with the alcohol mixture.

The amount of hydrocarbon entering as vapor at 20, as controlled by the operator by valve 18, re-appears as liquid in decanter 15 to be recycled and the amount of reflux flowing through pipe 16 will be sufficient by its evaporation to remove the heat added by the two heating elements; one in vaporizer 19 and one (24) in the base of the dehydrating column. Water is removed from decanter 15 by valve 25 and dehydrated alcohol from the base of column 9 through float controlled valve 26.

The general system of operating control is this: with substantially constant rate of feed at 3 or 4, a constant heat input is delivered to heater 24 by delivering to 24 so many pounds of steam per unit time or by maintaining in heater 24, by an automatic pressure regulator, steam at constant pressure. Flow of water at that degree of constancy in volume and temperature which can be maintained readily in commercial practice is delivered to condenser 14, this flow being so adjusted in consideration of the cooling load and the surface of condenser 14 that the resultant pressure when condensing the hydrocarbon will be the desired one. With the constant heating at 19 and 24 and constant cooling of the condenser 14, pressure will be equally constant and will fluctuate only to the extent of minor variations in the constancy of the heating and cooling. Such variations being the result of the vapor pressure properties of the various liquids and the mixtures at different points in the column must logically occur but are quite harmless to the desired equilibrium in the column. The operating pressure is as much above atmospheric as is economical, preferably between about 10 to 150 pounds.

It is desirable that the hydrocarbon on the upper plates be of reasonably uniform composition, either entirely free from alcohol as it may be or containing such a percentage of alcohol as is found best for economic (not technical) reasons. That is to say it is possible to remove water from the system at plates 10 and 11 whenever two liquid phases appear there. The lower the temperature maintained at this point the more nearly free from organic compound will the "water layer" be; but the greater the volume of hydrocarbon vapor which must be introduced at the bottom of section A to carry up to plates 10 and 11 a given amount of water. The optimum temperature there is therefore that one which will result in the formation of a "water layer" containing such an amount of water as will permit of its concentration back to that of the original feed entering at 4 by the cheaper means of extraction; salting out or distilling from it the water azeotrope of the organic substance.

In those cases where an azeotrope is formed between the organic compound and the light hydrocarbon being used, it will, because of the large difference between their boiling points, contain but a small percentage of the organic compound and may without loss or harmful effect continue in circulation through the cycle described with the hydrocarbon.

At any pressure it will be found that the temperature on a plate, preferably a few plates below the top one, will continuously indicate the percentage of alcohol in the hydrocarbon, which temperature will rise as the percentage of alcohol increases and vice versa. The automatic temperature control instrument 23 is so adjusted that as the temperature rises above the one determined and selected for economic reasons, it will slightly throttle valve 22 thus reducing the amount flowing back through pipe 21 and thus increasing the flow of reflux back through pipe 16, which has no valves for operating control but permits a flow of all pentane above a certain level in decanter 15.

If the alcohol be one where extraction with the hydrocarbon, as pentane, is not very effective in reducing its aqueous content, an alternative operation such as disclosed by Fig. II may be used. In such case, the alcohol recovery column 29' replaces the extraction apparatus. The water layer containing some alcohol is withdrawn from plates 10' and 11' and taken to column 29' through trap 28' and pipe 27'. Heating unit 31' causes the distillation of a constant boiling mixture of alcohol and water which passes up through pipe 35' into condenser 36' from which it is delivered back to the feed at 4' by means of pipe 34' and pump 30'. The remaining elements possessing primed numbers function in the same manner and combination as their corresponding values in Fig. I. The modification possesses no automatic control such as 23 or valve 22 with line 21 as in Fig. I, the dehydrator operating as a system closed with respect to the hydrocarbon as pentane. In operating this process an amount of hydrocarbon sufficient to fill decanter 15' and plates above 10' to operating level is initially introduced and replenished as necessitated by operating losses.

While I have in the foregoing described in some detail an apparatus constructed in accordance with my invention together with the preferred method of operating the same and some variants thereof, it will be understood that this is only for the purpose of making the invention more clear and that the invention is not to be regarded as limited to the details of construction or operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. The process of dehydrating organic compounds comprising "salting out" the organic compound, adding a hydrocarbon in vaporous state to said organic compound, driving off said hydrocarbon and the aqueous content of the organic compound as a vapor-mixture in the column containing a rectifying zone, refluxing said vapor mixture with a liquid hydrocarbon obtained by condensation of a portion of said vapor-mixture and returning the hydrocarbon condensate not employed as a reflux partly in a vaporous state to the organic compound to be dehydrated and partly in a liquid state to the organic compound to be "salted out" while continuously returning condensed aqueous organic compound from the rectifying zone to the organic compound to be "salted out".

2. The process of dehydrating organic compounds comprising adding a hydrocarbon in vaporous state to the organic compound, driving off as a vapor-mixture said hydrocarbon, the aqueous content of the organic compound and a small amount of the organic compound from a column, refluxing said vapor-mixture with a liquid hydrocarbon obtained by condensation of a portion of said vapor-mixture, returning the hydrocarbon condensate not employed as a reflux to the organic compound in a vaporous state, introducing the aqueous organic compound condensed by the reflux into a recovery system whereby partial dehydration is effected and returning the partially dehydrated organic compound into contact with the vaporous hydrocarbon in the column whereby the cycle is repeated.

3. In the process of dehydrating aqueous solution of organic compounds introduced in a column, the step of effecting the separation of the aqueous constituent from the organic constituent at superatmospheric pressure by the employment of the combined partial pressures of the aqueous constituent and of a hydrocarbon, said hydrocarbon being characterized by its failure to form an azeotrope with the organic compound, or one containing a substantial amount of the organic compound at atmospheric pressure, said hydrocarbon being introduced into the column at a point below the point of introduction of the bulk of the material to be dehydrated.

4. The process of dehydrating organic compounds in a column, comprising: distilling an aqueous solution of an alcohol at superatmospheric pressure in the presence of vapors and liquid of a readily condensible third agent, the third agent being substantially immiscible with water but substantially miscible with the alcohol when said third agent is in the liquid state, and which agent does not form an azeotrope with the alcohol, or one containing a substantial amount of the alcohol at atmospheric pressure.

5. The process of dehydrating organic compounds in a column, comprising: distilling an aqueous solution of an organic compound at superatmospheric pressure in the presence of vapors and liquid of a hydrocarbon containing not more than five carbon atoms to the molecule, said hydrocarbon being substantially miscible with the organic compound when said hydrocarbon is in the liquid state, and which hydrocarbon does not form an azeotrope with the organic compound or one containing a substantial amount of the organic compound at atmospheric pressure.

6. The process of dehydrating aliphatic alcohols in a column, comprising: distilling an aqueous solution of an aliphatic alcohol at superatmospheric pressure in the presence of vapors and liquid of a hydrocarbon containing not more than five carbon atoms to the molecule, said hydrocarbon being substantially miscible with the alcohol when said hydrocarbon is in the liquid state, and which hydrocarbon does not form an azeotrope with the alcohol or one containing a substantial amount of the alcohol at atmospheric pressure.

7. The process of dehydrating an aqueous solution of an alcohol in a column which comprises distilling said liquid mixture at superatmospheric pressure in the presence of vapors and liquid of a readily condensible third agent which, in the liquid state, is substantially immiscible with water and substantially miscible with the alcohol to be dehydrated, the third agent also being characterized by ts failure to substantially form an azeotrope with the alcohol or one containing a substantial amount of the alcohol at atmospheric pressure.

8. The process of dehydrating an aqueous solution of an organic compound in a column which comprises distilling said liquid mixture at superatmospheric pressure in the presence of vapors and liquid of a readily condensible third agent of the class consisting of olefine and paraffine hydrocarbons, the third agent also being characterized by its failure to substantially form an azeotrope with the organic compound or one containing a substantial amount of the organic compound at atmospheric pressure.

9. The process of dehydrating an aqueous solution of an organic compound in a column which comprises distilling said liquid mixture at superatmospheric pressure in the presence of vapors and liquid of a third agent whose boiling temperature is substantially below the boiling temperature of the aqueous solution which agent, in the liquid state, is substantially immiscible with water and substantially miscible with the organic compound to be dehydrated, the third agent also being characterized by its failure to substantially form an azeotrope with the organic compound or one containing a substantial amount of the organic compound at atmospheric pressure.

10. The process of dehydrating an aqueous solution of an alcohol in a column which comprises distilling said liquid mixture at superatmospheric pressure in the presence of vapors and liquid of a readily condensible third agent which, in the liquid state, is substantially immiscible with water and substantially miscible with the alcohol to be dehydrated, the third agent also being characterized by its failure to substantially form an azeotrope with the alcohol or one containing a substantial amount of the alcohol at atmospheric pressure and refluxing the mixed vapors with third agent in the liquid state.

11. The process of dehydrating an aqueous solution of an organic compound in a column which comprises distilling said liquid mixture at superatmospheric pressure in the presence of vapors and liquid of a readily condensible third agent of the class consisting of olefine and paraffine hydrocarbons, the third agent also being characterized by its failure to substantially form an azeotrope with the organic compound or one containing a substantial amount of the organic compound at atmospheric pressure, and refluxing the mixed vapors with liquid hydrocarbon obtained by condensation of a portion of the vapor mixture.

12. The process of dehydrating an aqueous solution of an organic compound in a column which comprises distilling said liquid mixture at superatmospheric pressure in the presence of vapors and liquid of a readily condensible paraffine hydrocarbon, the hydrocarbon being characterized by its failure to substantially form an azeotrope with the organic compound or one containing a substantial amount of the organic compound at atmospheric pressure, refluxing the mixed vapors with liquid hydrocarbon obtained by condensation of a portion of the vapor mixture and returning the hydrocarbon condensate not employed as a reflux, to the organic compound in the vaporous state.

13. The process of dehydrating an aqueous alcoholic solution which comprises adding an organic entraining agent characterized by its failure to form an azeotrope with the alcohol or one containing a substantial amount of the alcohol at atmospheric pressure in the vaporous state to the solution and distilling off said entraining agent and water, said entraining agent being substantially miscible with the alcohol.

14. The process of dehydrating an aqueous alcoholic solution which comprises adding an organic entraining agent characterized by its failure to form an azeotrope with the alcohol or one containing a substantial amount of the alcohol at atmospheric pressure in the vaporous state to the alcoholic solution in a column below the point of introduction of the bulk of the material to be dehydrated and distilling off said entraining agent and water, said added compound being substantially immiscible with water, but substantially miscible with the alcohol.

15. The process of dehydrating an aqueous alcoholic solution which comprises adding a hydrocarbon characterized by its failure to form an azeotrope with the alcohol or one containing a substantial amount of the alcohol at atmospheric pressure in the vaporous state to the solution and distilling off said hydrocarbon and water, said hydrocarbon being substantially miscible with the alcohol.

16. The process of dehydrating an aqueous alcoholic solution which comprises adding a hydrocarbon characterized by its failure to form an azeotrope with the alcohol or one containing a substantial amount of the alcohol at atmospheric pressure in the vaporous state to the alcoholic solution in a column below the point of introduction of the bulk of the material to be dehydrated and distilling off said hydrocarbon and water, said added compound being substantially immiscible with water, but substantially miscible with the alcohol.

17. The process of dehydrating an aqueous alcoholic solution which comprises adding a paraffin hydrocarbon characterized by its failure to form an azeotrope with the alcohol or one containing a substantial amount of the alcohol at atmospheric pressure in the vaporous state to the solution and distilling off said paraffin hydrocarbon and water, said paraffin hydrocarbon being substantially miscible with the alcohol.

18. The process of dehydrating an aqueous alcoholic solution which comprises adding a paraffin hydrocarbon characterized by its failure to form an azeotrope with the alcohol or one containing a substantial amount of the alcohol at atmospheric pressure in the vaporous state to the alcoholic solution in a column below the point of introduction of the bulk of the material to be dehydrated and distilling off said paraffin hydrocarbon and water, said added compound being substantially immiscible with water, but substantially miscible with the alcohol.

19. The process of dehydrating an aqueous alcoholic solution which comprises adding an entraining agent characterized by its failure to form an azeotrope with the alcohol or one containing a substantial amount of the alcohol at atmospheric pressure in the vaporous state to the solution and distilling off said entraining agent and water, said entraining agent being substantially miscible with the alcohol.

20. The process of dehydrating an aqueous alcoholic solution which comprises adding an entraining agent characterized by its failure to form an azeotrope with the alcohol or one containing a substantial amount of the alcohol at atmospheric pressure in the vaporous state to the solution, distilling off the said entraining agent and the water as a vapor mixture, and refluxing said vapor mixture with said entraining agent in the liquid state, dehydration being effected at superatmospheric pressure.

21. The process of dehydrating an aqueous alcoholic solution which comprises adding an organic entraining agent characterized by its failure to form an azeotrope with the alcohol or one containing a substantial amount of the alcohol at atmospheric pressure in the vapor state to the aqueous alcoholic solution and distilling off said organic entraining agent and water, the process being conducted at superatmospheric pressure.

22. The process of dehydrating an aqueous alcoholic solution which comprises adding a paraffin hydrocarbon characterized by its failure to form an azeotrope with the alcohol or one containing a substantial amount of the alcohol at atmospheric pressure in the vapor state to the aqueous alcoholic solution and distilling off said paraffin hydrocarbon and water, the process being conducted at superatmospheric pressure.

23. The process of dehydrating an aqueous organic solution which comprises reducing its aqueous content to a value less than that present in the binary azeotrope by extraction with a solvent for the organic compound which is also the entraining agent used in the subsequent dehydration stage and subjecting the resulting aqueous solution to rectification at an elevated temperature in the presence of an entraining agent characterized by its failure at atmospheric pressure to form an azeotrope with the organic compound to be dehydrated or one containing a substantial amount of the organic compound to be dehydrated, said entraining agent possessing a boiling temperature below that of said organic compound.

24. The process of dehydrating an aqueous alcoholic solution which comprises reducing its aqueous content to a value less than that present in the binary alcohol-water azeotrope and subjecting the resulting aqueous solution to rectification at an elevated temperature in the presence of an entraining agent characterized by its failure at atmospheric pressure to form an azeotrope with the alcohol or one containing a substantial amount of the alcohol, said entraining agent possessing a boiling temperature below that of the alcohol.

25. The process of dehydrating an aqueous organic solution which comprises reducing its aqueous content to a value less than that present in the binary azeotrope and subjecting the resulting aqueous solution to rectification at an elevated temperature in the presence of a hydrocarbon characterized by its failure at atmospheric pressure to form an azeotrope with the organic compound to be dehydrated or one containing a substantial amount of the organic compound to be dehydrated, said hydrocarbon possessing a boiling temperature below that of the organic compound.

26. The process of dehydrating an aqueous alcoholic solution which comprises distilling it in the presence of a readily condensible entraining agent characterized by its failure at atmospheric pressure to form an azeotrope with the alcohol or one containing a substantial amount of the alcohol, said entraining agent possessing a boiling temperature below that of the alcohol.

27. The process of dehydrating an aqueous alcoholic solution which comprises distilling it in the presence of a hydrocarbon characterized by its failure at atmospheric pressure to form an azeotrope with the alcohol or one containing a substantial amount of the alcohol, said hydrocarbon possessing a boiling temperature below that of the alcohol.

28. The process of dehydrating an aqueous organic solution which comprises distilling it in the presence of a relatively low-boiling entraining agent or the class consistsing of olefine and paraffin hydrocarbons, said entraining agent being characterized by its failure at atmospheric pressure to form an azeotrope with the organic compound or one containing a substantial amount of the organic compound.

29. The process of dehydrating an aqueous organic solution which comprises distilling it in the presence of an aliphatic hydrocarbon characterized by its failure at atmospheric pressure to form an azeotrope with the organic compound or one containing a substantial amount of the organic compound to be dehydrated, said hydrocarbon boiling below the boiling temperature of the organic compound.

30. A method of dehydrating an aqueous alcoholic solution which comprises subjecting it to an extraction operation with a solvent for the alcohol which solvent is capable of forming two phases with water and which boils at a temperature below the boiling temperature of the alcohol whereby the water-alcohol ratio in the solvent phase is reduced to a value below that of the corresponding binary azeotrope and rectifying the concentrated alcoholic solution in the presence of said solvent which acts as a water-entraining agent under the condition of rectification.

31. A method of dehydrating an aqueous alcoholic solution which comprises subjecting it to an extraction operation whereby the water-alcohol ratio is reduced to a value below that of the corresponding binary azeotrope and rectifying the resulting solution in the presence of a relatively low-boiling water-entraining agent which does not form at atmospheric pressure an azeotrope with the alcohol or an azeotrope containing a substantial amount of alcohol.

32. A method of dehydrating an aqueous organic solution which comprises subjecting it to an extraction operation with a hydrocarbon boiling below 100° C. whereby the water-organic compound ratio of the concentrated solution is reduced to a value below that of the corresponding binary azeotrope and rectifying the concentrated solution in the presence of said hydrocarbon.

33. A method of dehydrating an aqueous organic solution which comprises subjecting it to an extraction operation with an aliphatic hydrocarbon boiling below 100° C. whereby the water-organic compound ratio of the concentrated solution is reduced to a value below that of the corresponding binary azeotrope and rectifying the concentrated solution in the presence of said hydrocarbon.

34. A method of dehydrating an aqueous organic solution which comprises lowering its aqueous content by extraction with a hydrocarbon boiling below the boiling temperature of the organic compound in solution and rectifying the resulting solution in the presence of said hydrocarbon which is characterized by its failure at atmospheric pressure to form an azeotrope with the organic compound or an azeotrope containing a substantial amount of the organic compound.

35. In a method of dehydrating an aqueous organic solution whose water-organic compound ratio has been initially reduced, the step of rectifying such mixture in the presence of a hydrocarbon boiling below the boiling temperature of the organic compound to be dehydrated and characterized by its failure at atmospheric pressure to form an azeotrope with the organic compound or an azeotrope containing a substantial amount of the organic compound.

36. In a method of dehydrating an aqueous alcoholic solution whose water-alcohol ratio has been initially reduced, the step of rectifying such mixture in the presence of a water-entraining agent boiling below the boiling temperature of the alcohol and characterized by its failure at atmospheric pressure to form an azeotrope with the alcohol or an azeotrope which contains a substantial amount of the alcohol.

SAMUEL C. CARNEY.